US012564288B2

(12) United States Patent
Ulinich

(10) Patent No.: US 12,564,288 B2
(45) Date of Patent: Mar. 3, 2026

(54) UNIVERSAL DEVICE FOR HEAT TREATING FOOD PRODUCTS

(71) Applicant: Ivan Ulinich, Odesa (UA)

(72) Inventor: Ivan Ulinich, Odesa (UA)

( * ) Notice: Subject to any disclaimer, the term of this patent is extended or adjusted under 35 U.S.C. 154(b) by 690 days.

(21) Appl. No.: 17/904,598

(22) PCT Filed: Aug. 4, 2020

(86) PCT No.: PCT/UA2020/000079
§ 371 (c)(1),
(2) Date: Aug. 19, 2022

(87) PCT Pub. No.: WO2021/167579
PCT Pub. Date: Aug. 26, 2021

(65) Prior Publication Data
US 2024/0197110 A1    Jun. 20, 2024

(30) Foreign Application Priority Data

Feb. 19, 2020    (UA) .............................. a 2020 01081
Feb. 19, 2020    (UA) .............................. a 2020 01082

(51) Int. Cl.
| | |
|---|---|
| A47J 37/04 | (2006.01) |
| A47J 27/00 | (2006.01) |
| A47J 36/10 | (2006.01) |
| A47J 37/06 | (2006.01) |
| F24C 7/06 | (2006.01) |
| F24C 7/08 | (2006.01) |
| F24C 15/18 | (2006.01) |
| F24C 15/22 | (2006.01) |

(52) U.S. Cl.
CPC ............. *A47J 37/04* (2013.01); *A47J 27/004* (2013.01); *A47J 36/10* (2013.01); *A47J 37/0611* (2013.01); *A47J 37/0635* (2013.01); *F24C 7/067* (2013.01); *F24C 7/082* (2013.01); *F24C 15/18* (2013.01); *F24C 15/22* (2013.01)

(58) Field of Classification Search
CPC .......... A47J 37/04; A47J 27/004; A47J 36/10; A47J 37/0611; A47J 37/0635; A47J 37/041; A47J 37/00; A47J 37/06; F24C 7/067; F24C 7/082; F24C 15/18; F24C 15/22
See application file for complete search history.

(56) References Cited

U.S. PATENT DOCUMENTS 5,699,722 A    12/1997   Erickson

FOREIGN PATENT DOCUMENTS

| | | |
|---|---|---|
| JP | 3466949 | 11/2003 |
| RU | 2019988 | 9/1994 |
| RU | 2218066 | 12/2003 |
| RU | 39032 | 7/2004 |

(Continued)

*Primary Examiner* — Robert G Bachner
(74) *Attorney, Agent, or Firm* — Defillo & Associates, Inc.; Evelyn A. Defillo

(57) ABSTRACT

A device for cooking food products by heat treatment comprises a housing and also a hinged lid connected to said housing by means of universal pivotable fastening devices. Electric heating elements are mounted inside the housing and on the inner side of the hinged lid, and control panels for controlling the electric heating elements are disposed on a lateral side of the housing and on the hinged lid. The device can contain two hinged lids which can be lifted away from the housing simultaneously or individually and are capable of pivoting through 90°, 180° or 270°.

7 Claims, 15 Drawing Sheets

(56)    References Cited

FOREIGN PATENT DOCUMENTS

| | | |
|---|---|---|
| RU | 75922 | 9/2008 |
| RU | 2416354 | 4/2011 |
| UA | 37175 | 4/2008 |
| UA | 36238 | 10/2008 |
| UA | 47453 | 2/2010 |
| UA | 81920 | 7/2013 |
| UA | 88655 | 3/2014 |
| UA | 93064 | 9/2014 |

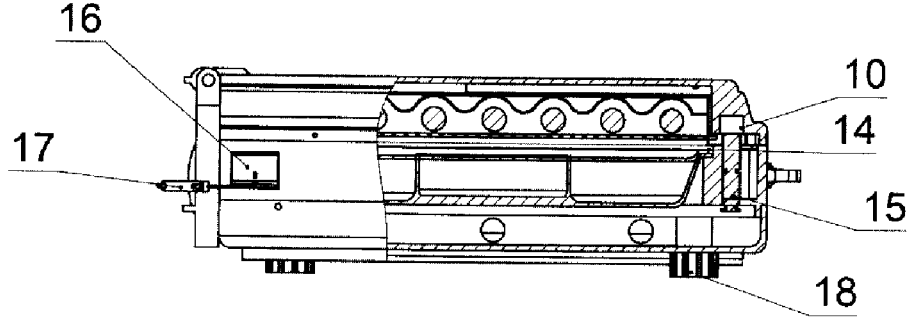
Fig.4
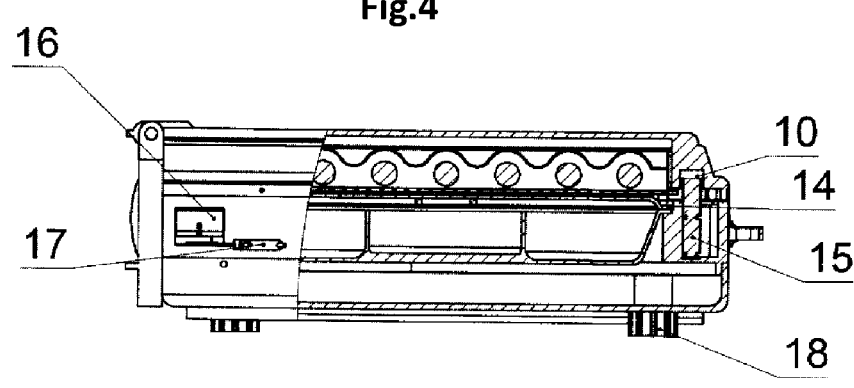
Fig.5
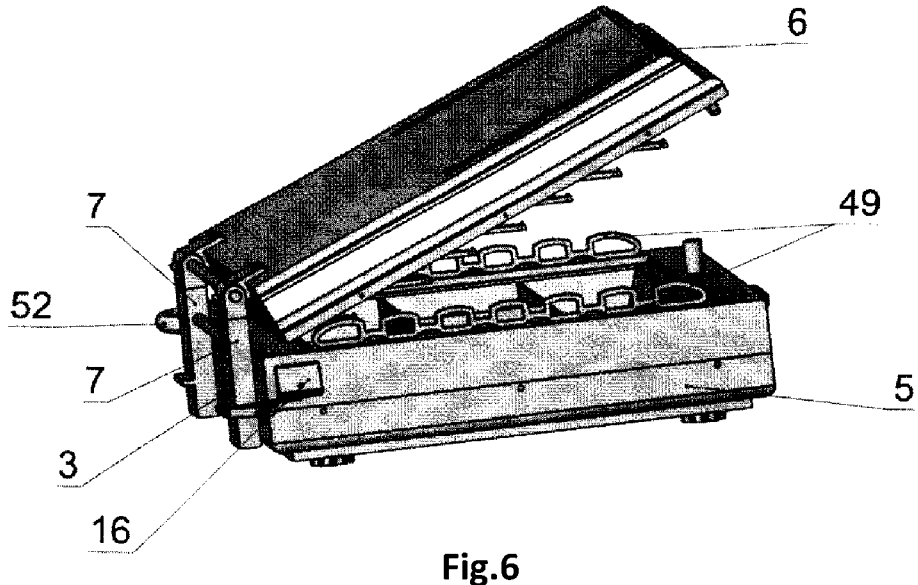
Fig.6

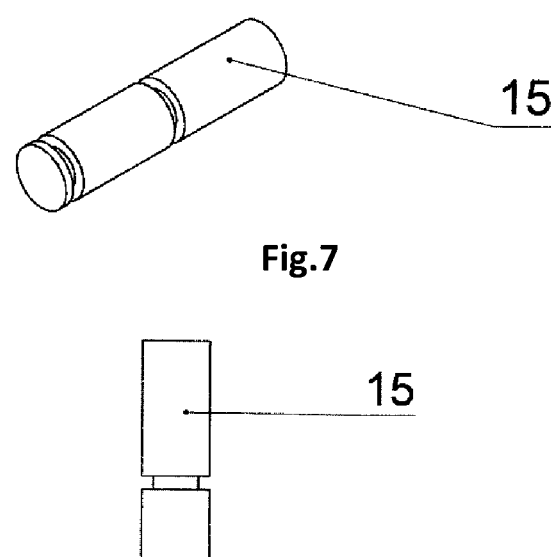
Fig.7
Fig.8
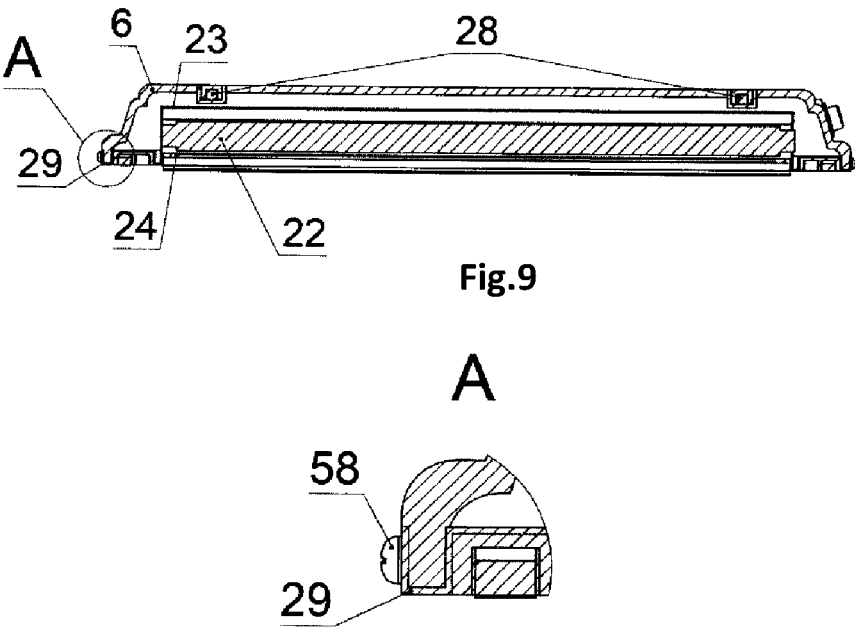
Fig.9
A
Fig.10

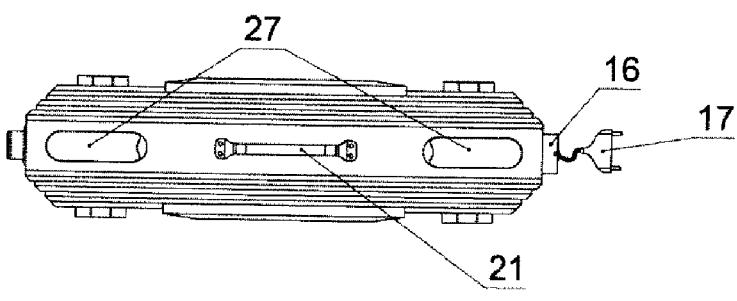
Fig.26
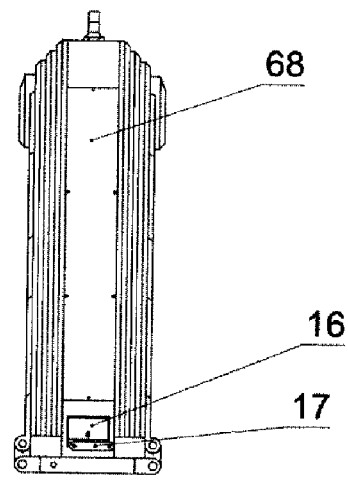
Fig.26
Fig.28

UNIVERSAL DEVICE FOR HEAT TREATING FOOD PRODUCTS

CROSS REFERENCE TO RELATED APPLICATION

This application is a national stage entry of PCT/UA2020/000079 filed Aug. 4, 2020, under the International Convention and claiming priority over Ukrainian Patent Application No. a 2020 01081 filed Feb. 19, 2020 and Ukrainian Patent Application No. a 2020 01082 filed Feb. 19, 2020.

FIELD OF THE INVENTION

The invention relates to household appliances, namely, portable and universal electrical appliances, which are configured as economical and smokeless devices powered by 220 V mains and intended for cooking food by heat treatment of products, and is a device that can be used in various places and under different conditions, in particular, in an apartment, in a private house, in the street (yard), in a garage, in a country house, outdoors, on roofs, in rail, river and sea transport, in restaurants, cafes and bars both for cooking and for heating food, barbecue and also for drying mushrooms, fish and fruit. The list of dishes that can be prepared using such a device is determined in the hundreds. Those are meat, fish, vegetables, first and second courses, juices, compotes, tea, coffee, and so on.

BACKGROUND OF THE INVENTION

There is a known apparatus for frying food, which comprises a stationary housing with a built-in vertical heater, electric actuator and thermostatic controller. The heater consists of three high-temperature electric heating elements of shaped forms. Around it, there are six flat rectangular double grills, which are radial-arranged and equipped with springs for fixing products. The shanks of the grills are fixed in the movable part of the apparatus enabling the above grills each to rotate around the heater and the own axe of symmetry due to the availability of a planetary mechanism (see the Patent of Ukraine for Utility Model No. 47453).

There is also a known energy-saving device for heat treatment of food products comprising a housing with a lid, a mesh basket located in the housing and an electric heater arranged under the mesh basket. The housing and the lid are made according to the principle of a thermos, in the working container of which, there is a temperature sensor electrically connected to the power control unit for electric energy consumed by the electric heater. In addition, grooves are made in the thermos lid to provide for power wire inlets for the electric heater and the temperature sensor (see the Ukrainian Patent for Utility Model No. 36238).

There is a known multifunctional device for thermal (heat) treatment of food products, which consists of a cylindrical housing, a removable tray and a removable grill. In the housing, there are openings for air circulation; at least one carrying handle is detachably attached to the outer side surface of the housing; the tray and the grill are made with the possibility of detachably fastening to the housing; the removable grill has a flanged edge; and a perforated partition separates the housing into the upper and lower chambers (see the Patent of Ukraine for Utility Model No. 93064).

In addition, there is a known combined frying device with electric contact heating, which consists of two hinged dielectric slabs, configured to form cells for placing semi-finished products when closed. To regulate the mode parameters for heating individual layers of the semi-finished product, the electrodes for electro contact heating are arranged vertically with respect to the heating slabs (see the Patent of Ukraine for Utility Model No. 88655).

There is a known multifunctional device for heat treatment of food products, consisting of a loading bowl, a hinged lid with IR heaters and a reflector. The base of the loading bowl is coated on the inside with a non-stick fluoroplastic coating, and electric heating elements are mounted on the outside thereof, as well. Electrode sections provided with dielectric inserts are arranged perpendicular to the side surfaces and the base of the loading bowl. The dielectric inserts are fixed by locks with the possibility of changing interelectrode distances (see the Patent of Ukraine for Utility Model No. 37175).

In fact, there is a known dismountable thermo-mangal consisting of two rectangular long lateral walls, two rectangular short lateral walls, four legs and a removable bottom.

Each lateral wall consists of inner and outer walls welded together. Each outer wall of the long lateral walls is configured to be longer than the inner wall connected to this outer wall with forming lateral end protruding flat edges, while each of those protruding flat edges has at least two openings. The length of this inner wall is equal to the distance between the legs this inner wall is attached thereto, and the length of the outer wall of the long lateral wall is equal to the length of the thermo-mangal, and the lower part of this wall is made side-bent by the inner wall connected thereto to form a shelf protruding inside the thermo-mangal after assembling thereof. Each outer wall of the short lateral walls is configured to be longer than the inner wall connected to this outer wall with forming lateral end protruding Γ-shaped edges, while each of those protruding Γ-shaped edges has at least two openings in the bent end thereof. The length of this inner short lateral wall is equal to the distance between the legs this inner short lateral wall is attached thereto, and the length of the outer short lateral wall between the bent ends of the Γ-shaped edges is equal to the width of the thermo-mangal, and the lower part of this wall is made side-bent by the inner wall connected thereto to form a shelf protruding inside the thermo-mangal after assembling thereof. The removable bottom is made rectangular in the form of a gutter provided with horizontal supporting shelves being arranged along the long sides of the removable bottom. The removable bottom can be installed on the shelves of the outer walls of the long lateral walls with the formation of two slotted end holes below and along the short lateral walls. In this case, on each lower short lateral wall from below thereof, a damper with a handle is installed with the possibility of horizontal movement thereof in relation to the slotted end hole, opposite which it is installed, and with the opportunity of overlapping this slotted end hole. The thermo-mangal also comprises a grate made in the form of a rectangular perforated tray provided with sides. The tray is mounted on the removable bottom to support the above tray, while the above tray has a possibility of being installed with the tray sides directed up or down. At least two threaded openings are made in the legs, and when the lateral walls are installed on the legs, the openings made in the above lateral walls coincide with the threaded openings in the legs, and through the openings in the lateral walls, screws with handles are inserted into the threaded openings. With the help of the above screws, the lateral walls are connected to the legs when cleaning the thermo-mangal. The hinged grills are formed by a rectangular wire frame and wire rods arranged parallel along the long side of the rectangular frame and along the long lateral wall of the thermal-mangal (see the Ukrainian Utility Model Patent No. 81920).

In addition, an electric plug-in rotisserie—oven is known (see RF Patent for Invention No. 22180661, Electric Plug-in Rotisserie—Ovens (RF Patents for Utility Models Nos. 39032, 75922) and other technical solutions.

However, both the above described and other devices for heat treatment of food products, which are known to the applicant, only partially solve the stated technical problem. In terms of design, they are in agreement with the claimed device entirely by the presence of separate structural elements, for example, such as a housing, a lid, heating elements, a tray, legs, and the like.

On the contrary, the known technical solutions are fundamentally different both in terms of structural design and the principle of solving the technical problem, as well as the technical results achieved when implementing the proposed device.

In connection with the above, the applicant believes that none of the technical solutions known to him could be chosen as a prototype, and their criticism would not be correct.

SUMMARY OF THE INVENTION

The invention is based on the technical problem of creating a universal device for heat treatment of food products, wherein due to using quite a different design of the device, introducing new assembly units and elements into it, as well as new positional relationship of the assembly units and elements and their links, to increase efficiency, provide the possibility of cooking wide range of dishes thereby, amend conditions for preparing various dishes, achieve energy saving, as well as to apply the device for a whole year or more in any premises, to use it in trains, sea transport, to save electricity due to the operation of electric heating elements as needed, to produce in several modifications, and to provide a set of cutlery.

The device is environmentally friendly, smokeless, easy to operate, repairable and replaceable with electric heating elements.

The problem is solved by a universal device for heat treatment of food products, made in three variants.

In accordance with the first variant, the problem is solved by a universal device for heat treatment of food products, which contains a housing and a hinged lid connected to the housing using universal locking rotary devices, while inside the housing, in its lower part, there are electric heating elements fixed in the lateral walls thereof; above the electric heating elements, there is a tray for raw materials being processed, while the tray being mounted on the protrusions made on the front, rear, right and left walls of the housing provided with a lid in the upper part thereof; at the outer side of the housing wall, there is a control panel; the top of the housing front wall is provided with a seat for a stop designed to fix the hinged lid; at the lower part of the housing, there are legs and guide slides; and at the upper parts of the right and left walls of the housing, there are other seats for skewer holders; on the inside of the hinged lid, over its entire area, there is a reflector connected to the hinged lid along its perimeter to form an air chamber; in addition, once again, on the inside of the hinged lid, there are other electric heating elements and other hinged skewers holders; at the front and rear sides of the hinged lid, there are other seats for installing a protective grill; at the front side of the hinged lid, there is another seat for the other stop, another control panel is located on the outer side of the hinged lid, and hinged legs are installed on the outer upper side of the hinged lid; the universal locking rotary devices are structurally identical, each universal locking rotary device includes a body, a retractable fork installed inside the body of the universal locking rotary device with the possibility of moving in the vertical direction, and the lower part of the retractable fork is fixed in the body of the universal locking rotary device, and the upper part of the retractable fork is connected to a mounting bracket provided with a latch; in the retractable fork, there is a special seat for the latch; in the body of each universal locking rotary device, there is another seat for another latch designed to secure the retractable fork; the bodies of the universal locking rotary devices are interconnected by a hollow tube, inside which there is a cable connecting these lathes, and the mounting brackets are interconnected by an axle, while the lower parts of the bodies of the universal locking rotary devices are attached to the rear wall of the housing of the claimed device, and the mounting brackets of the universal locking rotary devices are attached to the hinged lid.

In accordance with the second variant of the claimed invention, the set problem is solved by a universal device for heat treatment of food products, which contains a housing and a hinged lid connected to the housing using universal locking rotary devices, while inside the housing, in its lower part, there is a tray for raw materials being processed, while the tray being mounted on the protrusions made on the front, rear, right and left walls of the housing provided with a lid in the upper part thereof; the top of the housing front wall is provided with a seat for a stop designed to fix the hinged lid; at the lower part of the housing, there are legs and guide slides; and at the upper parts of the right and left walls of the housing, there are other seats for skewer holders; on the inside of the hinged lid, over its entire area, there is a reflector connected to the hinged lid along its perimeter to form an air chamber;

in addition, on the inside of the hinged lid, there are electric heating elements and other hinged skewers holders; at the front and rear sides of the hinged lid, there are other seats for installing a protective grill; at the front side of the hinged lid, there is another seat for the other stop, another control panel is located on the outer side of the hinged lid, and hinged legs are installed on the outer upper side of the hinged lid; the universal locking rotary devices are structurally identical, each universal locking rotary device includes a body, a retractable fork installed inside the body of the universal locking rotary device with the ability of moving in the vertical direction, and the lower part of the retractable fork is fixed in the body of the universal locking rotary device, and the upper part of the retractable fork is connected to a mounting bracket provided with a latch; in the retractable fork, there is a special seat for the latch; in the body of each universal locking rotary device, there is a seat for the latch designed to secure the retractable fork; the bodies of the universal locking rotary devices are interconnected by a hollow tube, inside which there is a cable connecting those latches, and the mounting brackets are interconnected by an axle, while the lower parts of the bodies of the universal locking rotary devices are attached to the rear wall of the housing of the claimed device, and the mounting brackets of the universal locking rotary devices are attached to the hinged lid.

Moreover, the devices after the first and second variants each additionally comprises a container for cutlery, whereon the housing is installed.

In accordance with the third variant, the problem is solved by a universal device for heat treatment of food products, which contains a housing and the right and the left hinged lids connected to the housing using, for example, two universal locking rotary devices, while at the front wall of the housing, there is a control panel for electric heating elements installed inside the housing; in the upper part of the housing, there are recesses for fixing elements of hinged lid locks, made identical, while each separate hinged lid being of a rectangular shape; inside each hinged lid, there is a reflector and hinged skewer holders connected to a body for the hinged skewers holders; air chambers are created between the inner sides of the hinged lids and the reflectors; in addition, a seat for the reflector and a seat for the body of the skewer holders are made in each hinged lid, and abutting legs are located on the outer side of each hinged lid; universal locking rotary devices are also made identical, and each of the universal locking rotary devices includes a body, right T-shaped and left π-shaped retractable forks, the right and left retractable forks are connected through coupling links to the mounting brackets with the possibility of rotation on the axles, through which the retractable forks are connected to the coupling links, and on the axles, through which the mounting brackets are connected to the coupling links; in addition, in the body of each universal locking rotary device, an axle for fixing the right retractable fork and an axle for fixing the left retractable fork are installed, while the lower part of the claimed device housing is connected to the body of each of the universal locking rotary devices, and the lower parts of the right and left hinged lids are connected to the mounting brackets of the above universal locking rotary devices.

Moreover, in the device according to the third variant:

the housing is made in the form of a rectangular frame, in the front and rear parts of which, there are special seats for the electric heating elements, and in the lower part of the housing, there are recesses for attaching a protective grill;

the retractable forks are installed in the body of the universal locking rotary device in such a way that the vertical element of the T-shaped retractable fork is located between two vertical elements of the I-shaped retractable fork.

BRIEF DESCRIPTION OF THE DRAWINGS

The universal device for heat treatment of food products is shown in the drawings, where:

FIG. 4 shows the left side view, partial section (Variant 1);

FIG. 5 shows the left side view, partial section (Variant 2);

FIG. 6 shows the overview of the device in the ajar state (Variants 1, 2);

FIG. 7 shows the overview of the stop (Variants 1, 2);

FIG. 8 shows the stop, the front view (Variants 1, 2);

FIG. 9 shows the hinged lid in section, the front view (Variants 1, 2);

FIG. 10 shows the assembly unit of the hinged lid with the reflector (Variants 1, 2);

FIG. 26 shows the top view of the device (Variant 3);

FIG. 27 shows the rear view of the device (Variant 3);

FIG. 28 shows the view of the device on the right (Variant 3);

DETAILED DESCRIPTION OF THE PREFERRED EMBODIMENT

Figure 1:
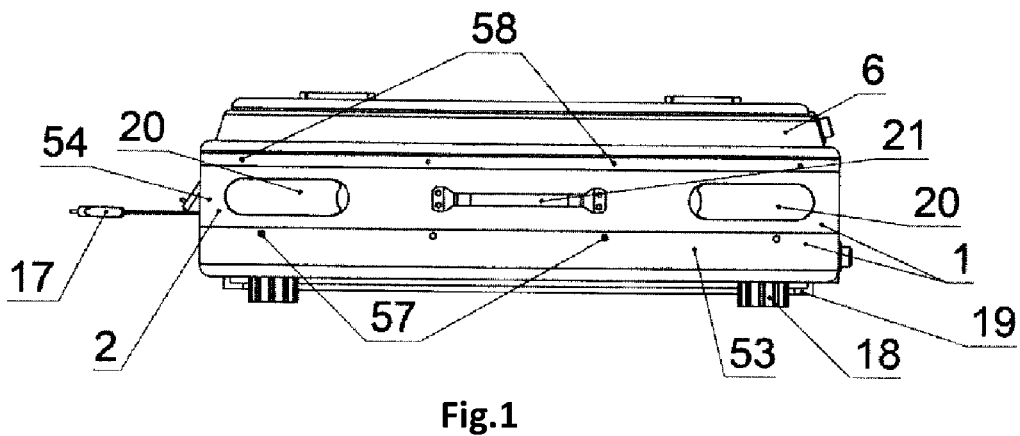
FIG. 1 shows the view of the device in the assembled state, the front view (Variants 1 and 2)

The universal device for heat treatment of food products according to the first variant of the claimed invention comprises housing 1, hinged lid 6 connected to housing 1 using, for example, two universal locking rotary devices 7. Housing 1 has front 2 (FIG. 1), rear 3 (FIG. 6), right 4 (FIG. 2) and left 5 (FIG. 6) walls.

Housing 1 consists of the lower 53 and upper 54 parts (FIG. 1) interconnected by means of connecting elements 57, for example, bolts (FIG. 1).

Inside housing 1, in the lower part 53, there are electric heating elements 8 (FIG. 2), fixed in the right 4 and left 5 walls of housing 1.

Above electric heating elements 8, there is tray 9 (FIG. 2) for raw materials being processed, while the tray being mounted on protrusions 14 (FIG. 4) made on front 2, rear 3, right 4 and left 5 walls of housing 1.

Figure 2:
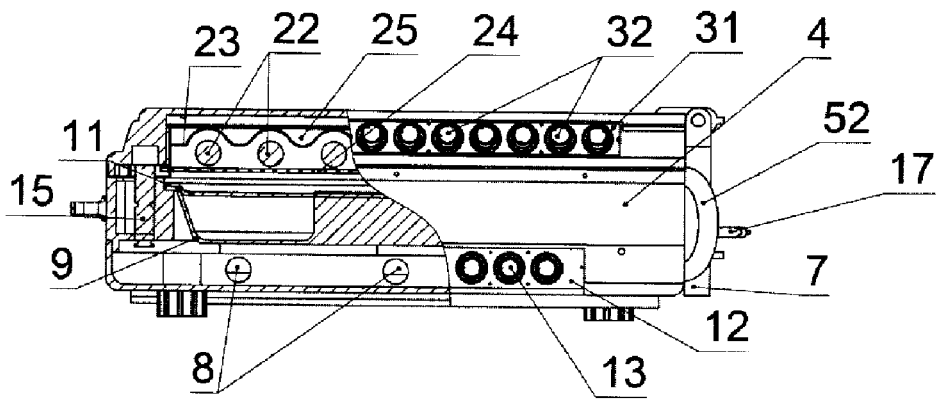
FIG. 2 shows the right-side view, in section (Variant 1)

On the upper part of tray 9, there is lid 11 of the tray (FIG. 2).

On the outer side of housing 1, on its right wall 4, there is control panel 12 with buttons 13 (FIG. 2).

In the top 54 of the front wall 2 of housing 1, there is seat 10 (FIG. 4) for stop 15 (FIGS. 7; 8), which is designed to fix hinged lid 6 in the horizontal.

In left wall 5 of housing 1, there is a recess for cable 17 with a plug, which recess is closed by lid 16 (FIG. 5).

Figures 18, 19, 20:
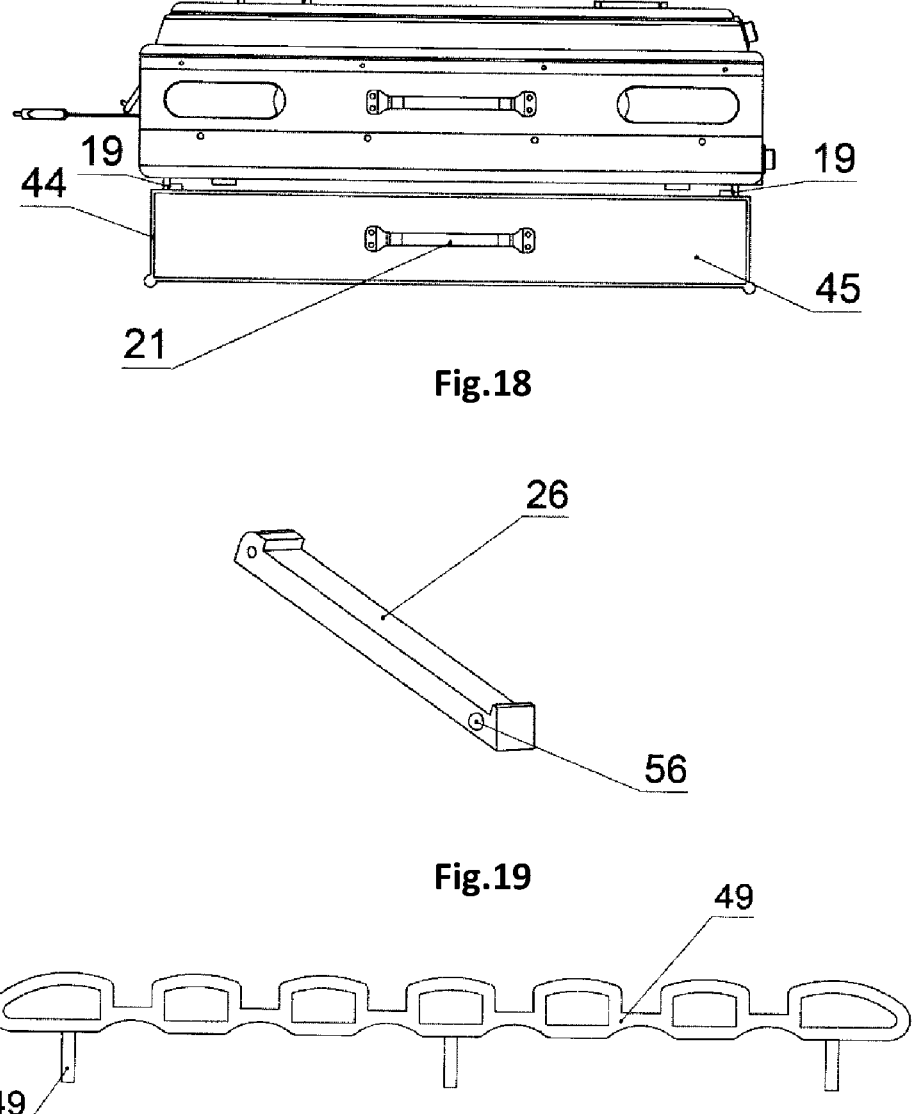
FIG. 18 shows the view of the device with the additional container for cutlery storage (Variants 1, 2)
FIG. 19 shows the view of the hinged holder for skewers (Variants 1, 2, 3)
FIG. 20 shows the view of the hinged holder for the skewers in the housing (Variants 1, 2)

At the lower part of the bottom of housing 1, there are legs 18 (FIGS. 1, 4, and 5) and guide slides 19 to arrange additional container 45 (for cutlery sets: forks, spoons, knives, etc.), which container has case 44 and guide slides 19 (FIG. 18).

Into front wall 2 of housing 1, there are mounted locks 20, and handle 21 for carrying the device (FIG. 1).

On the upper part of left 5 and right 4 walls of housing 1, seats 50 (FIG. 21) are made for holders of skewers 49 (FIG. 6, 20), and on the upper part of front wall 2, seats 55 (FIG. 21) are formed to receive fixing lock elements 20.

On the inside of hinged lid 6 (over its entire area), there is reflector 23 (FIG. 2) connected with hinged lid 6 along its perimeter due to connecting assembly unit 29 and bolts 58 (FIG. 10) in such a way that between the inner side of hinged lid 6 and reflector 23, there is a formed air chamber 25 (FIG. 2).

In the inner part of hinged lid 6, on its right and left sides, the electric heating elements 22 are horizontally fixed, for example, electric heaters 22, which are saved with removable protective grill 24 (FIG. 2).

Removable protective grill 24 is installed into seats 59 (FIG. 11) at the front and rear sides of hinged lid 6 from the inside thereof.

At the right and left sides of hinged lid 6, from the inside thereof, there are installed (fixed) hinged skewers holders 26 (FIG. 11), being provided each with ball 56 for fixing hinged skewers holder 26 in a vertical closed position (FIG. 19). Ball 56 rests against the wall of housing 1 when being closed.

Figure 11:
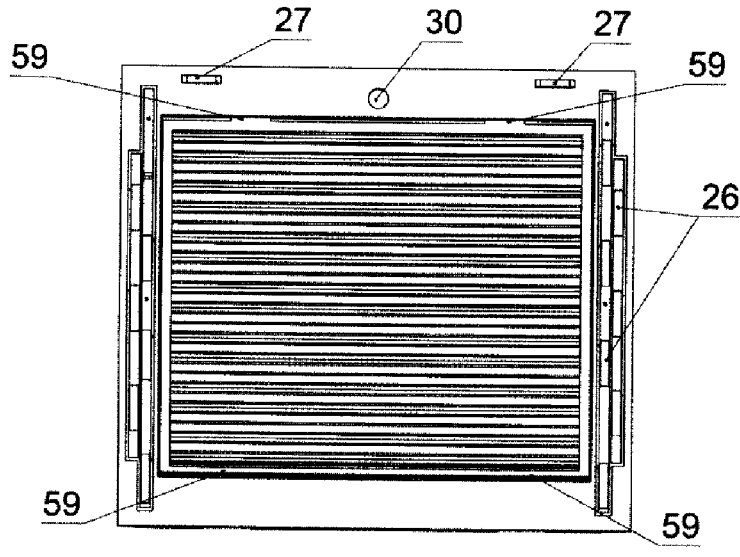
FIG. 11 shows the view of the hinged lid in the open state (Variants 1, 2)

At the front side of hinged lid 6, there are locking elements of locks 27 and seat 30 for stop 15 (FIG. 11).

Figure 12:
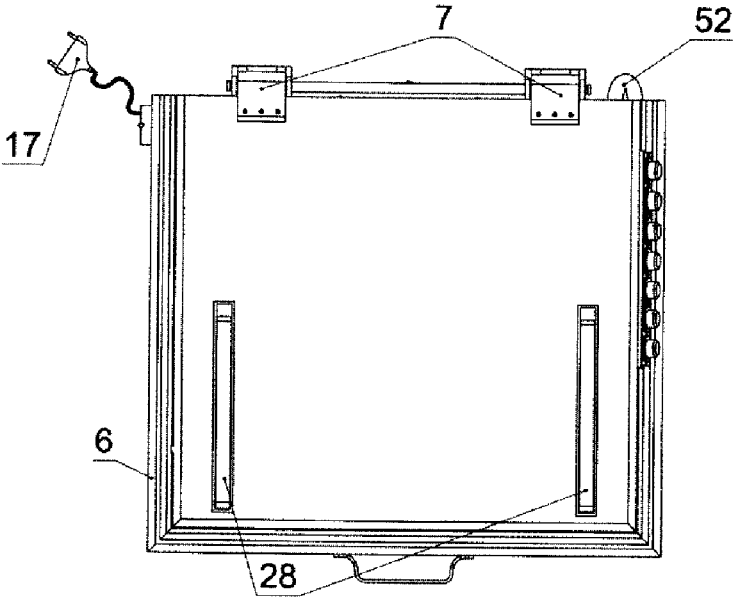
FIG. 12 shows the hinged lid, the top view (Variants 1, 2)
Figure 13:
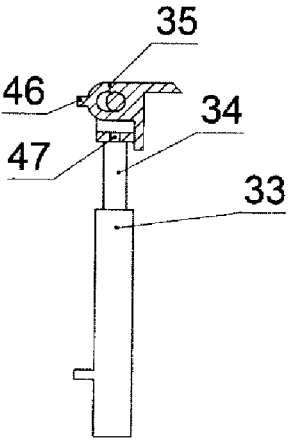
FIG. 13 shows the universal locking rotary device, the side view (Variants 1, 2)
Figure 14:
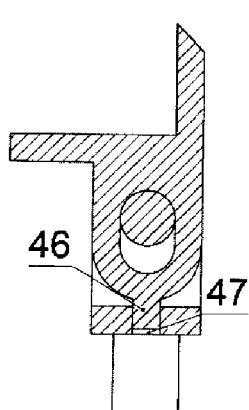
FIG. 14 shows the view of the assembly unit of the universal locking rotary device (Variants 1, 2)
Figure 15:
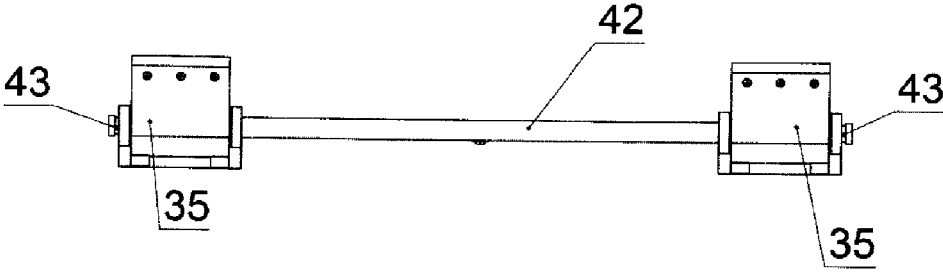
FIG. 15 shows the universal locking rotary device, the top view (Variants 1, 2)

At the outer side of hinged lid 6, there are abutting hinged legs 28, which serve as a stop when using a device with a horizontal position of the hinged lid in the open position (FIGS. 9, 12).

At the right side of hinged lid 6, from the outer side thereof, there is control panel 31 with control buttons 32 (FIG. 2).

Figure 23:
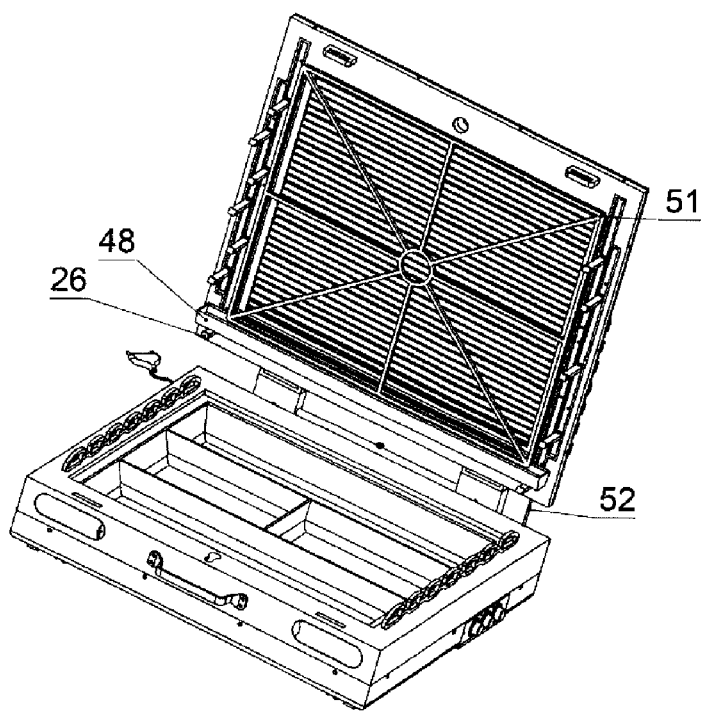
FIG. 23 shows the view of the device with the vertical arrangement of the hinged lid (Variant 1)
Figure 24:
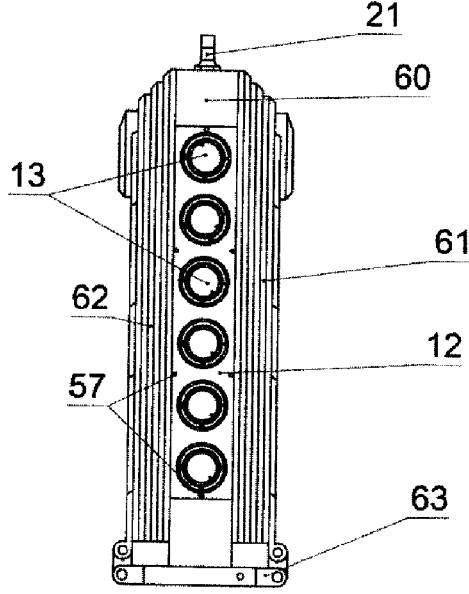
FIG. 24 shows the front view of the device (Variant 3)

To accumulate fat flowing down from the meat being treated when hinged lid 6 is in a vertical position (FIG. 23), additional tray 48 is installed in the lower part of reflector 23 on the hinged skewer holders 26 (FIG. 23).

As mentioned above, housing 1 of the universal device for heat treatment of food products is connected to hinged lid 6 with the help of universal locking rotary devices 7 (there are two of them in the proposed embodiment, but their number may be different). Universal locking rotary devices 7 are made in such a way that hinged lid 6 could be lifted up, creating a horizontal gap between hinged lid 6 and housing 1 (FIG. 6), and also fixed in a vertical position (FIG. 23), and in the open position through 180° (FIG. 21) so that it could be used as a working electrical surface. This allows the device to be versatile and cook a large number of dishes therein, and even several dishes at the same time.

Structurally, both universal locking rotary devices 7 are made identically. Each universal locking rotary device 7 includes body 33, wherein retractable fork 34 is installed with the possibility of moving in the vertical direction, while the lower part of retractable fork 34 is fixed in body 33, and its upper part is connected to mounting bracket 35, which is provided with latch 46. In the retractable fork 34 of universal locking rotary device 7, there is seat 47 for latch 46 (FIGS. 13, 14, 15, 16, 17).

Figures 16, 17:
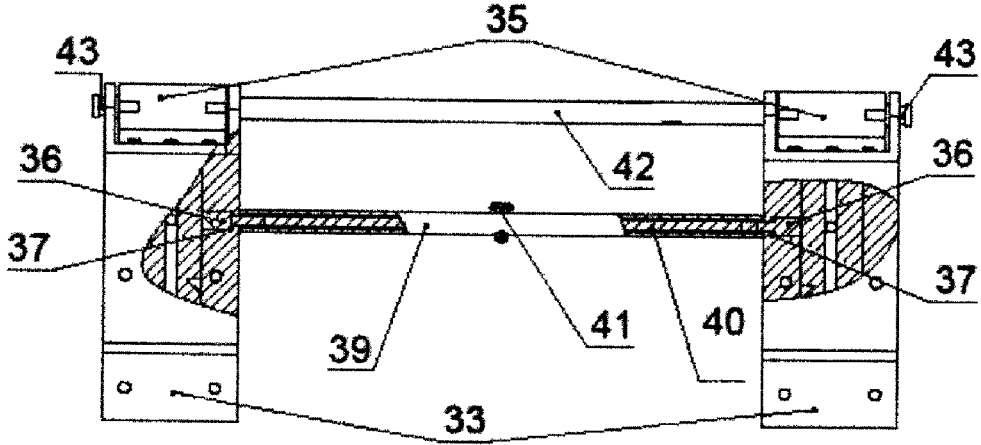
FIG. 16 shows the view of the universal locking rotary device as the assembly unit (Variants 1, 2)
FIG. 17 shows the view of the universal locking rotary device in the open state (Variants 1, 2)

In the body of each universal locking rotary device 7, there is seat 37 for latch 36 provided with a spring (the spring is not shown in the drawing) (FIG. 16).

In the body of each retractable fork 34, seat 38 is also made for latch 36 (FIG. 17).

Bodies 33 of each universal locking rotary device 7 are interconnected by hollow tube 39, inside which, there is cable 40 connecting latches 36 each located in body 33 of corresponding universal locking rotary device 7 (FIGS. 16, 17).

In the central part (approximately in the middle) of hollow tube 39, there is built-in adjusting screw 41, which is connected to cable 40 (FIG. 16).

Adjusting screw 41 rotating to the left or right actuates cable 40 and latches 36 actuated to unlock retractable forks 34, and make those retractable forks 34 lower down into body 33 of universal locking rotary device 7.

The mounting brackets 35 of universal fixing rotary devices 7 are interconnected by special axle 42, the ends of which are located in respective mounting brackets 35 and fixed therein with corresponding locking screws 43 (FIG. 16).

The universal device for heat treatment of food products may additionally comprise container 45 for cutlery, having case 44, whereon there are guide slides 19 similar to the slides located on the lower part of housing 1. When using the additional container 45 for cutlery, housing 1 is mounted on case 44 with the help of guide slides 19 (FIG. 18).

Figure 21:
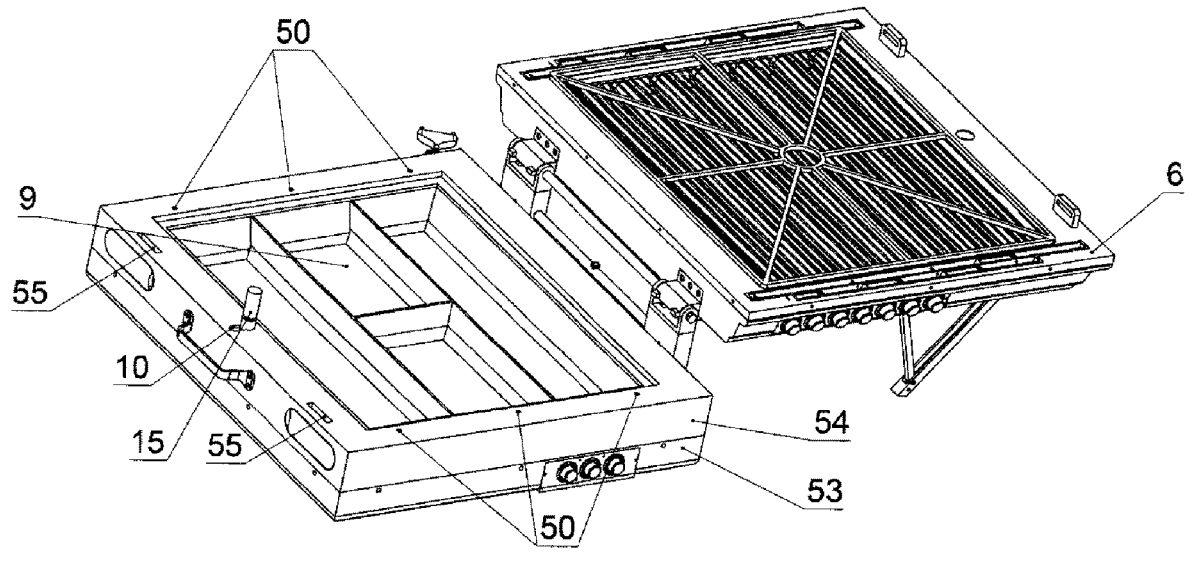
FIG. 21 shows the universal device in the open state (the top view) (Variant 1)
Figure 22:
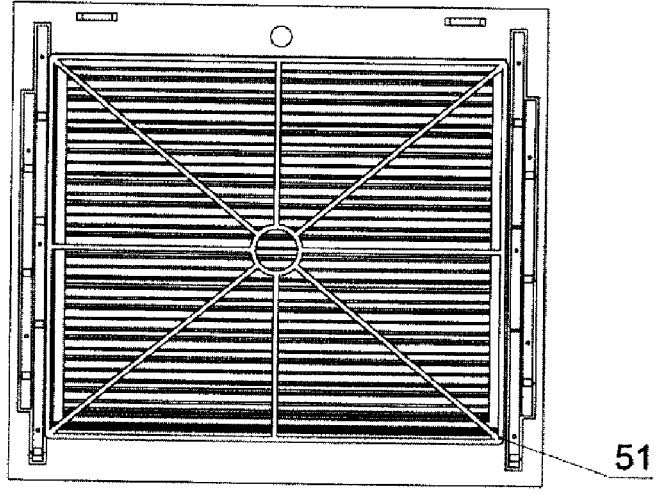
FIG. 22 shows the view of the hinged lid with an additional grill (Variants 1, 2)

The claimed device is also equipped with additional grill 51 (FIG. 22) to provide for electric surface when hinged lid 6 is arranged in a horizontal position (FIG. 21).

Housing 1 is electrically connected to control buttons 32 of hinged lid 6 with the help of electrical cable 52.

Preparing the Device for Work.

Having chosen the installation site of the device, the user gets free it from all foreign objects that may be obstacles in the process of this device use, since in the course of the heat treatment process, the user would have to deal with both the device itself, which operates at 220 U from the mains, and also with related items, for example, skewers, pots, pans, kettles, in which food and extra items would be cooked (warmed up), are not only obstacles, but also may cause burns, etc.

A user can install housing 1 horizontally on legs 18, open the recess for the cable, pull cable 17 out up to its full length, open locks 20, raise hinged lid 6 to a vertical position, fixing it with latch 46 of mounting bracket 35 into seat 47 of latch 46.

For safety purposes, it is recommended to conduct an external inspection of the entire device, as well as the assembly units, items of the device itself that are not necessary at the moment of starting its operation, paying special attention to the electrical part of the device, fully realizing the fact of no damage to cable 17. The entire inspection procedure takes less than a minute, but safety must be remembered every time before starting the device to operate and the electrical safety rules should be strictly observed.

Having carried out the inspection and witnessed for themselves that the device is ready for operation, the users check the performance of electric heating elements 8, 22.

Therein (FIG. 23), the device is in an open, vertical position, which allows estimating the state of electric heating elements 22 in hinged lid 6. To check the state of electric heating elements 8, it is necessary to remove lid 11 of tray 9 and tray 9 itself from housing 1. After that, the user connects the electric cable with plug 17 to the socket. In this case, the device is powered from the mains of 220 V, but electric current is not supplied to electric heating elements 22. Then the user pushes control button 32 of hinged lid 6 and control buttons 13 of housing 1 in turn and individually for each electric heating element 8, 22. A few seconds later, the user pulls cable 17 with the plug out of the socket and visually, as well as lightly touching electric heating elements 8, 22, he makes sure that all electric heating elements 8, 22 are warm, which fact indicates their serviceability. The device is ready for further operation.

The device is universal and can be incorporated into several modes:

I. The operation of the device in the closed state; horizontal arrangement with a fixed gap (FIG. 6) between hinged lid 6 and housing 1.

II. Hinged cover 6 is in vertical position (FIG. 23).

III. The operation of the device in the open state; horizontal arrangement with open hinged lid 6 through 180° (FIG. 21).

The operation of the device in the closed state; horizontal arrangement with a fixed gap (FIG. 6) between hinged lid 6 and housing 1.

This mode of operation of the device provides three options—A, B, C.

Option "A".

The user installs housing 1 horizontally on legs 18, then opens the recess for cable 17 and pulls it out, opens locks 20, raises hinged lid 6 up to a vertical position and fixes it with latch 46 of mounting bracket 35 into the seat of latch 47; in the upper part 54 of the housing, the user sets stop 15 at the required height to fix the gap of hinged lid 6 in seat 10 for stop 15; in upper part 54 of the housing, on the left and right sides, the user installs removable skewers holders 49 into seat 50; after that, vertically mounted hinged lid 6 together with retractable fork 34 of universal locking rotary device 7 is lifted by the user up to the height corresponding to the height of stop 15. Retractable fork 34 is automatically fixed by latch 36 of retractable fork 34 with a spring.

Then the skewers with meat or a metal grill with meat, mushrooms, fish, vegetables, etc. (not shown) are installed on removable skewers holders 49, after which hinged lid 6 descends onto upper part 54 of housing 1, having previously unlocked latch 46 of mounting bracket 35 in seat 47, and rests against stop 15, which fixes hinged lid 6.

The cable with plug 17 is connected to the mains of 220 V\V, control button 32 is pushed, and electric current is supplied to electric heating elements 22. Electric heating elements 22 heat up, supplying heat to the meat (or other dish) in upper-lower direction. Reflector 23 amplifies and directs the heat in the desired and set direction, while the temperature is regulated by control buttons 32 with turning them left or right.

The skewers are manually rotated around the axes. The grills with meat are turned over 180° by lifting hinged lid 6.

When the meat is ready, hinged lid 6 is fixed in a vertical position (FIG. 23), electric heating elements 22 are turned off by pressing control buttons 32 or by removing the electrical plug from the socket. In this case, all electric heating elements 22 are turned off simultaneously. When cooking barbecue and other meat, vegetable dishes horizontally, the lid of tray 11 serves as an accumulator of fat, liquid, but the user can also remove it, and then the tray itself becomes accumulator 9.

Lid 11 of tray 9 is formed with curved edges and of large dimensions; therefore, it can be used as a server for ready-made barbecue, bread, cutting raw meat, peeling vegetables, etc.

Option "B".

The installation procedure for housing 1 is the same as described for Option A.

Having installed housing 1, a user removes tray lid 11, opening tray 9 for the processed raw materials. Tray 9 consists of several compartments, in which several individual dishes can be cooked all at the same time. Using tray 9 as a frying pan, saucepan, cauldron, one can fry potatoes, eggs, mushrooms, fish, and a lot of other dishes. After carrying out the procedures for filling tray 9, the user descends hinged lid 6 onto the upper part of housing 1, having previously unlocked latch 46 of mounting bracket 35 in seat 47, while hinged lid 6) abutting against stop 15 for fixing hinged lid 6.

The cable with plug 17 is connected to the 220 V mains, control buttons 13, 32 are pushed on, and electric current is applied to electric heating elements 8, 22. Electric heating elements 8, 22 are heated supplying their heat to tray 9 simultaneously from below and from above. The temperature is adjusted by turning control buttons 13.32. Reflector 23 reflects the heat applying it in a predetermined direction, in this case, from top to bottom. The cooking process is controlled lifting hinged lid 6 upwards, and if necessary, fixing it in a vertical position. All manipulations are carried out easily, quickly and naturally without any effort.

On completing the process of cooking, electric heating elements 8, 22 are turned off by pushing control buttons 13, 32 or removing the plug with cable 17 from the socket.

Cooking practices are wide and various and change annually. Traditional cooking methods are replaced by new, unusual and at first glance strange ones. It is scarcely imaginable that preparation of the first and liquid courses, namely, borscht, soups with chicken, fish soups, pickles and others, the second courses such as cereals, meatballs and many other dishes would be prepared in an unusual, unconventional way. The device allows carrying out experiments and if there are known dishes, the preparation of which provides for the supply of heat only from top to bottom, the claimed device open an opportunity of cooking dishes in such a way. Taking into consideration that tray 9 is divided into five separate compartments, and then it is possible to cook five dishes parallel by applying heat in upper-lower direction. However, gourmet dishes are invented through experiments and this device allows doing those. For example, having filled out all the five compartments of tray 9 with different products, the specified diches can be cooked simultaneously while combining the supply of the heat to tray 9 partially from electric heating elements 8 from below and partially from electric heating elements 22 in upper-lower direction, or while simultaneously heating entire tray 9 by electric heating elements 8 from below together with supplying the heat from electric heating elements 22 to tray 9 in the upper-lower direction.

Option "C".

The installation procedure for housing 1 is the same as described for Option A.

A user removes the tray lid 11 with opening tray 9 for the raw materials and products being processed. Tray 9 consists of five compartments, in which five separate dishes can be simultaneously cooked using tray 9 as a pot or frying pan.

After filling the compartments of tray 9 with products for cooking dishes, a user puts down hinged lid 6 onto housing 1 upper part, having previously unlocked latch 46 of mounting bracket 35 in seat 47, with hinged lid 6 resting against stop 15 for fixing hinged lid 6. The cable with the plug 17 is connected to the 220 V mains, control button 32 is pushed and electric current is applied to electric heating elements 22. Electric heating elements 22 heat up with supplying the heat to tray 9 and its content in the upper-lower direction.

The temperature is adjusted by turning control buttons 32 to the left and right.

Reflector 23 reflects the heat by directing it in a predetermined upper-lower direction. The cooking process is controlled by lifting hinged lid 6 upwards, and if necessary, it is fixed in a vertical position.

Having completed the cooking process, a user turns off electric heating elements 22 by pushing control buttons 32 or by removing the plug with cable 17 from the socket.

Operation of the device in a vertical position, with hinged cover 6 open through 90° (FIG. 23).

A user installs housing 1 horizontally on legs 18, opens the recess with the cable therein, pulls cable 17 out, opens locks 20, lifts hinged lid 6 to the vertical position and fixes it with latch 46 of mounting bracket 35 into the seat of latch 47.

Using the device in such a position with vertically open hinged lid 6, it is possible to cook many meat dishes on skewers and grills, which are located on the skewer hinged holders 26 installed in the upper-lower direction and horizontally relative to the plane of reflector 23 and hinged lid 6.

Hinged skewer holders 26 are installed on the right and left sides of reflector 23 on the front side thereof. Hinged skewer holders 26 deflect at an angle of 90° relative to the plane of reflector 23.

Skewers (not shown) with meat, vegetables, fruit are installed on deflected hinged skewer holders 26 horizontally in the upper-lower direction.

A grid or grill (not shown) with meat on the bone, meat grilled dumplings, pita bread with cheese and many other dishes is installed on the top, left and right hinged skewer holders 26 in the upper-lower direction and parallel to reflector 23.

On the lower hinged skewer holders 26, additional tray 48 is installed to collect fat (liquid), which flows down from meat, fish, vegetables, fruit in the course of processing thereof.

On selecting the dish for cooking, a user places it on hinged skewer holders 26, connects the plug with cable 17 to the electrical socket, push control button 32 and turning the button, select the desired heating mode for electric heating elements 22.

When operated at such a vertical arrangement, the device allows cooking food also in tray 9 for raw materials being processed.

After that, the user removes lid 11 of the tray, puts the food products into a compartment or several compartments or into all the compartments of tray 9, pushes control buttons 13 and turning them, sets the optimum temperature for electric heating elements 8. In the course of cooking dishes, by pushing control buttons 13 and 32, the user can turn off those electric heating elements 8, which are surplus to requirements. At the end of the cooking process, the user removes the plug with cable 17 from the socket.

The operation of the device in the horizontal position with hinged lid 6 being opened through 180° (FIG. 21).

A user installs housing 1 horizontally on legs 18, opens the recess for cable 17 and pulls it out, opens locks 20, raises hinged lid 6 up to a vertical position and without fixing, throw it through 180° horizontally, fixes it in this position with abutting hinged legs 28, which mounted on the outside of hinged lid 6.

Thus, we here get a device that is installed with reflector 23 arranged above in a horizontal position and attached with abutting hinged legs 28 for stability. Additional grill 51 is installed on reflector 23 (the physical configuration can be changed).

Additional grill 51, which is made of a refractory and durable material, serves as a surface for appliances wherein food would be cooked, such as pots, pans, boilers, kettles, etc.

In the device of such an arrangement, it is possible to cook in tray 9, since there are electric heating elements 8 with control buttons 13 in housing 1, as well as electric heating elements 22 with control buttons 32 on hinged lid 6. At such an arrangement, almost any dish can be cooked.

Additional grill 51 is fixed at the corners on protrusions 14.

After carrying out all the procedures for putting the products into the device, the user connects plugged cable 17 to electric socket, pushes control buttons 32, 13, and sets the desired temperature by turning the buttons to the left or right.

Having completed cooking, the user pushes control buttons 32, 13 and pulls plug of cable 17 out of the socket.

The complete set of this device provides for container 45 for a tray with cutlery sets, on which housing 1 is installed and fixed with guide slides 19.

This device can be used with or without cutlery container 45.

When operating the device with hinged lid 6 open through 180° (FIG. 21) and additional container 45 fixed, the stability of the device is not disturbed. Abutting hinged legs 28 on the outer side of hinged lid 6 provide for additional fastening of case 44 of container 45, with a change in the height of the device due to attached container 45.

Figure 3:
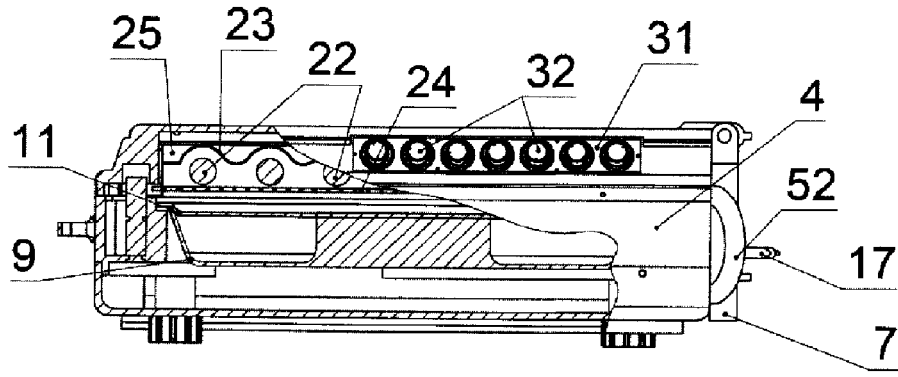
FIG. 3 shows the right-side view, in section (Variant 2)

The universal device for heat treatment of food according to the second variant differs from the first variant only in that inside housing 1, in lower part 53 thereof, there are no electric heating elements, and in that on the outer side of housing 1, on its right wall, there is no control panel with buttons (see FIGS. 3, 5). The other component parts are the same as in the first variant.

Preparation of the device for operation according to the second variant is carried out in the same way as described above. After preparing the device for operation, checking the serviceability, operability of heaters 22, the user installs housing 1 horizontally on legs 18, opens the recess for cable 17 and pull it out. The user opens locks 20 raises hinged lid 6 and fixes it with latch 46 of mounting bracket 35, in the seat of latch 47.

In upper part 54 of the housing, the user sets stop 15 up to the required height to fix the gap of hinged lid 6 into seat 10 for stop 15.

In upper part 54 of the housing, on the left and right sides, removable skewer holders 49 are installed into seat 50.

Vertically mounted hinged lid 6, together with retractable fork 34 of universal locking rotary device 7, is lifted up to a height corresponding to the height of stop 15. Retractable fork 34 is automatically fixed by latch 36 with a spring.

Skewers with meat or a grill with meat, mushrooms, fish, vegetables, etc. (not shown) are installed onto removable skewer holders 49. Having unlocked latch 46 of mounting bracket 35 with seat 47, which rests against stop 15 for fixing hinged lid 6, the user descends hinged lid 6 onto upper part 54 of housing 1.

The cable 17 with plug is connected to the mains of 220 V, control button 32 is pushed, and electric current is supplied to electric heating elements 22. Electric heating elements 22 heat up, applying heat to the meat (or another dish) in the upper-lower direction. Reflector 23 amplifies the heat and directs it to the desired and previously set direction. In this case, the temperature is adjusted by control buttons 32 by turning them left or right.

The skewers are manually rotated on the axles. Grills with meat are turned over through 180° at lifting the hinged cover 6.

On the meat dish having been completed ready, hinged lid 6 is fixed in a vertical position (FIG. 23), heating elements 22 are turned off by pushing control buttons 32 or by removing the electrical plug from the socket. In this case, all electric heaters 22 are simultaneously turned off. When cooking shashlyk and other meat or vegetable dishes at horizontally arranging the device, lid 11 of tray 9 serves as a receiver for fat and liquid. However, this lid can be removed, and then tray 9 itself would become the receiver.

Lid 11 of tray 9 is of large dimensions and with curved edges, therefore, it can be used as a server for ready-made barbecue, bread, surfaces for cutting raw meat, peeling vegetables, etc.

The universal device for heat treatment of food products according to the third variant contains housing 60, right 61, left 62 hinged lids connected to housing 60 using, for example, two universal locking rotary devices 63.

Figure 29:
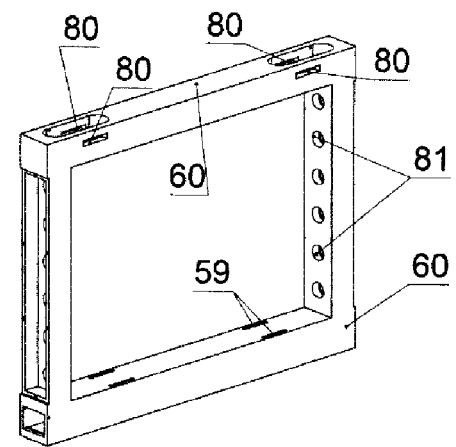
FIG. 29 shows the view of the frame of the housing (Variant 3)
Figure 35:
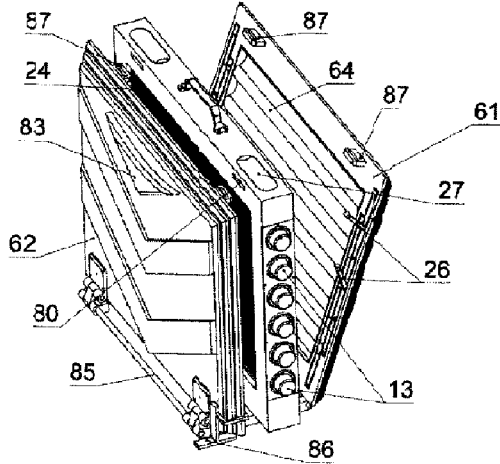
FIG. 35 shows the view of the device in the state where the hinged lids are retracted (Variant 3)

At the front wall of housing 60, there is control panel 12 provided with control buttons 13 and electric heating elements 22 installed in housing 60. In the outer upper side of housing 60, there is handle 21 for carrying the device around, and the locking elements for locks 27 (FIG. 26). To protect against contact with heating elements 22, removable protective grill 24 is provided (FIG. 35). Housing 60 of the device is made in the form of a rectangular frame (FIG. 29). Seats 81 for electric heating elements 22 are made at the front and rear walls of housing 60 frame (on its inner side). In the lower part of housing 60 (on its inner side) there are seats 59 for attaching removable protective grille 24, and in the upper part of housing 60 (on the outer side) recesses 80 are made for locating the fixing elements of locks 27 for hinged lids 61 and 62.

Closed by lid 16, in the lower part of the rear wall of housing 60, there is a recess for cable 17 provided with plug. The rear wall of housing 60 is closed with protective plate 68 (FIG. 27).

Hinged lids 61 and 62 are made identical. Each of them has a rectangular shape. On the inside of each hinged lid 61 and 62, there is reflector 64, hinged skewer holders 26, and body 65 for hinged skewer holders 26 (FIG. 30)

Figure 25:
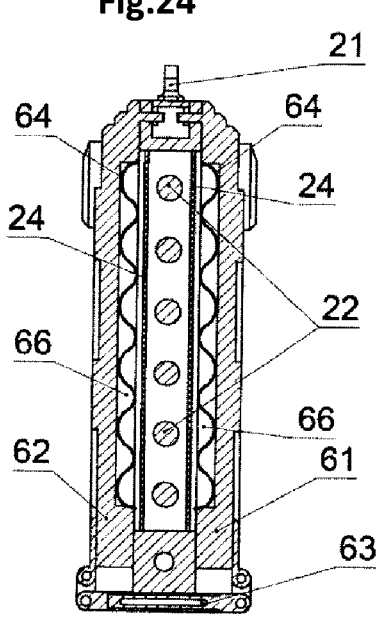
FIG. 25 shows the front view of the device with a partial section (Variant 3)
Figure 30:
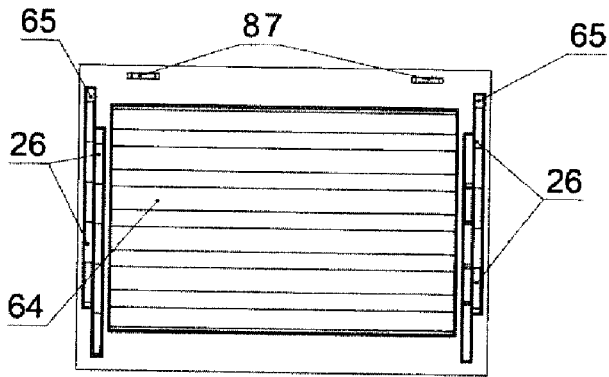
FIG. 30 shows the view of the hinged lid from the inside (Variant 3)

In the upper part of each hinged lid 61, 62, there are connecting elements 87 (FIG. 30). Air chambers 66 are formed between the inner sides of hinged lids 61, 62 and reflectors 64 (FIG. 25).

Figure 38:
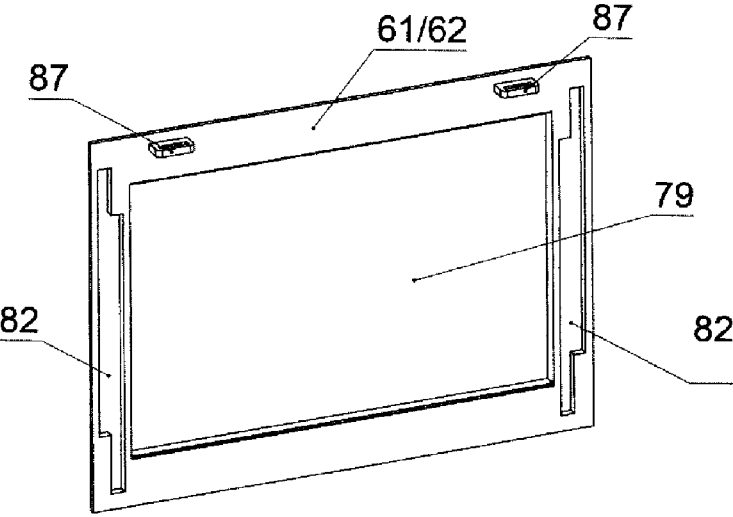
FIG. 38 shows the view of the seat in the hinged lids (Variant 3).

Hinged lids 61, 62 each also has seat 79 for reflector 64 and seat 82 for body 65 of the skewer holders (FIG. 38).

Figure 36:
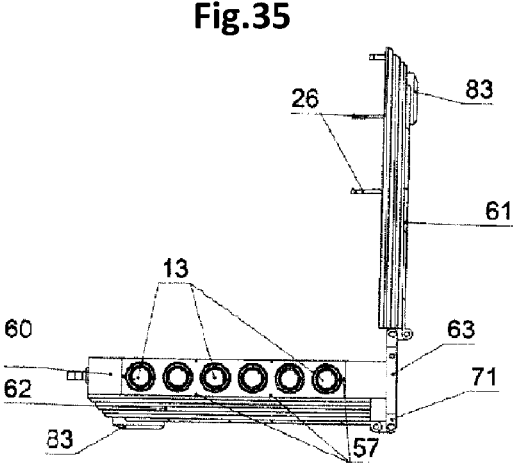
FIG. 36 shows the view of the device in a horizontal position with a vertically open right hinged lid (Variant 3)

On the outer side of each hinged lid 61, 62, there are abutting legs 83 (FIG. 36).

Universal locking rotary devices 63 are also made identical.

Figure 31:
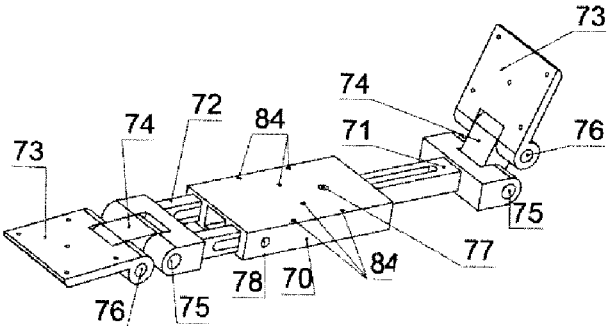
FIG. 31 shows the view of the universal locking rotary device (Variant 3)
Figure 32:
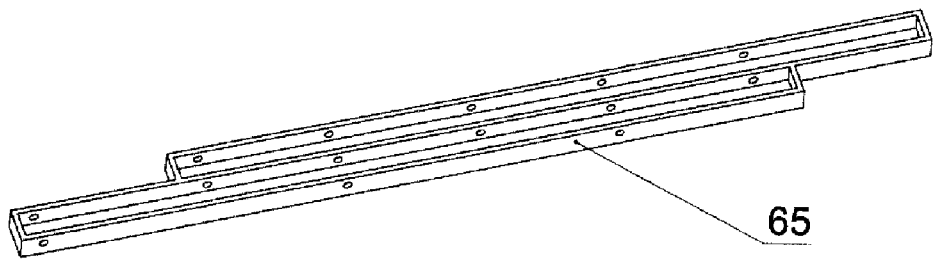
FIG. 32 shows the view of the body for the hinged holders of the skewers (Variant 3)

Each universal locking rotary device 63 includes body 70, within which there are located the right T-shaped retractable fork 71 and the left U-shaped retractable fork 72 (FIG. 31).

At the same time, retractable forks 71 and 72 are installed in boy 70 of the universal locking rotary device 63 in such a way that the vertical element of the right T-shaped retractable fork 71 is located between the two vertical elements of the left U-shaped retractable fork 72.

Right 71 and left 72 retractable forks are connected through connecting links 74 to mounting brackets 73 with the possibility of their rotation on axles 75, through which retractable forks 71 and 72 are connected to connecting links 74, and on axles 76, through which mounting brackets 73 are connected to connecting links 74. Two locking axles are installed in body 70: axle 77 is for fixing right retractable fork 71, and ax axle 78 is for fixing left retractable fork 72.

Control panel 12 is attached to the front of housing 60 using screws (screw-nails) 57. To fasten housing 60 to universal locking rotary devices 63, openings 84 for fasteners (screws, screw-nails) are made in body 70 of each universal locking rotary device 63 (FIG. 31).

Universal locking rotary devices 63 are interconnected by means of axle 85 (FIG. 35).

The lower part of housing 60 of the device is connected to body 70 of each universal locking rotary device 63, and the lower parts of right 71 and left 72 retractable forks of hinged lids 61, 62 are connected to mounting brackets 73 of the universal locking rotary devices 63.

Figure 33:
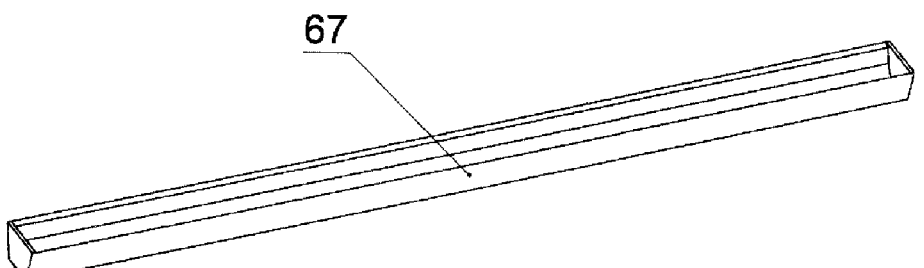
FIG. 33 shows the view of the additional tray (Variants 3)
Figure 34:
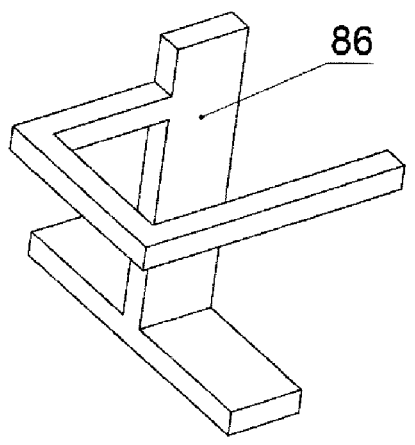
FIG. 34 shows the view of the holder of the hinged lids (option 3)
Figure 37:
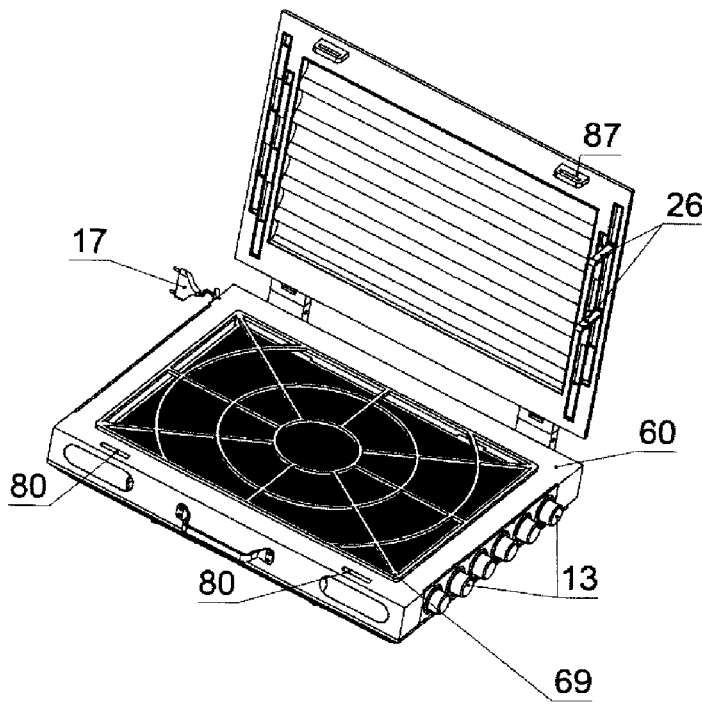
FIG. 37 shows the view of the device in a horizontal position with an additional grill (Variant 3)

The device is also equipped with holders 86 (FIG. 34) for attaching hinged lids 61, 62, and with tray 67 (FIG. 33) for fat accumulation, and with an additional grid 69 (FIG. 37).

The universal device for heat treatment of food products according to the third variant is applied in the following order.

Having selected and freed up space from unnecessary items, the user arranges the device vertically, installing it on universal fixing rotary devices 63 with control buttons 13 towards him. Then, he takes the cable with the plug 17 out of the recess.

Depending on the selected dish, the device is installed in a standing position (FIG. 35) or horizontally (FIG. 36).

In the upright position, the user opens the locking elements of locks 27, after which hinged lids 61 and 62 are smoothly moved away from housing 60 (FIG. 35) to the left and right and vertically descended with the help of mounting bracket 73 and connecting link 74.

Having fixed hinged lids 61, 62 with holders 86 of those lids, the user gets shifting lids 61 and 62 to the left and right from housing 60 with the use of retractable forks 71, 72, doing so until they stop. Rejecting skewer holders 26, the user installs tray 67 to accumulate fat on hinged skewer holders 26, and after that the user connects cable plug 17 to the 220 V mains. Now the device is ready for operation in upright position.

After putting products into the device, the user pushes control buttons 13 and turns them in a proper way to set the desired heating. After cooking the dish, the user pushes control buttons 13 and turns off the power supply followed with removing cable plug 17 from the 220 V mains.

In the upright position, there are mainly cooked meat, portioned dishes, barbecue, grilled meat, vegetables in a basket, mushrooms on skewers, cheese in dough, etc.

In the horizontal position, the user arranges the device horizontally. In this case, retractable forks 71, 72 and abutting legs 83 (FIGS. 36, 37) on hinged lid 62 serve as a support. The user releases the fixing elements of lock 27, lifts and fixes hinged lid 61 vertically, with hinged lid holder 86.

Additional grill 69 is installed on housing 60 of the device, while removable protective grill 24 can be unlocked and removed or left in place. The physical configuration of additional grill 69 can be of different types, namely, like a grate, a solid tray, which can serve as a roaster or a server for cooked meat. Then the user takes cable 17 plug out of the cable recess and connects it to the 220 V mains.

The device is ready for use. After putting the products, the user pushes control buttons 13 applying electric current to electric heating elements 22.

Having completed the cooking procedure, the user pushes control buttons 13 and pulls cable 17 plug out of the 220 V mains.

To avoid burns, as well as a contact of meat with electric heating elements 22, removable protective grille 24 is installed, which is attached to the seats 59 of the housing 60.

For maintenance and inspection of electric heaters 22, protective plate 68 is installed on the back of housing 60, which protective plate 68 is attached with fixing fasteners (screws) 57.

Reflector 64 is designed in such a way that the heat from electric heating elements 22 is applied to the left and right sides of hinged lids 61, 62, where reflectors 64 are installed into seats 79.

When cooking barbecue or other meat dishes, the heat from electric heating elements 22 is applied directly on the meat, the rest of the heat passes on and, having been reflected by reflector 64, returns back, frying the meat on the backside.

When the device is horizontally arranged (FIG. 36), right hinged lid 61 is fixed in the vertical position and does not participate in the operation of the device. Left hinged lid 62 together with housing 60 are installed horizontally and create a working electrical surface.

Thus, the heat is supplied from electric heating elements 22 upward to the object, wherein the food is being cooked, and also downward to reflector 64 of left hinged lid 62, thereby amplifying the heat fed upward to the object, wherein the food is being cooked. If it is necessary to reduce the heat, this can be done turning control buttons 13 in a proper way.

While installing reflectors 64 in hinged lids 61, 62, air chambers 66 are formed. To get out of heating those air chambers, seat 79 and heat reflector 64 are treated with thermal paint or a paste of increased resistance to high temperature from the side of air chambers 66.

In housing 60, in the upper part on the left and right sides thereof, there are recesses 80 made for the fixing elements of locks 27 (FIG. 37). While closing the device, to be saved, connecting elements 87 enter the recesses 80. Thus, hinged lids 61, 62 are fixed with the help of the fixing elements of locks 27.

Universal locking rotary devices 63 are structurally designed in such a way that body 70 encloses all the components and parts and allows each hinged lid 61, 62 to work without fail, open through 180°, telescopically extend to calculated distance in order to provide for successful operation.

INDUSTRIAL APPLICABILITY 3 (three) experimental specimens of a universal device for heat treatment of food products were industrially manufactured.

The specimen tests confirmed the advantages of the claimed universal device in comparison with similar devices known to the applicant.

The invention claimed is:

1. A universal device for heat treatment of food products comprising:
- a housing (1) including lateral walls (4, 5), a front wall (2), a rear wall (3), a lower part, and an inside part,
- a first lid (6) connected to the housing (1) by a locking rotary devices (7),
- wherein the inside part, on the lower part of the housing (1) includes electric heating elements (8) fixed to the lateral walls,
- a tray (9) located above the electric heating elements (8), the tray (9) is adapted to receive raw materials being processed,
- wherein the tray (9) is mounted on protrusions (14) located on the front wall (2), the rear wall (3), and the lateral walls of the housing (1),
- a second lid (11) attached to an upper part of the tray (9),
- a first control panel (12) attached to an outer side of one of the lateral walls of housing (1),
- a seat (10) located on the front wall (2) of the housing (1),
- a receive stop (15) to attach the seat (10) to the first lid (6),
- legs (18) located on the lower part of the housing (1),
- guide slides (19) located at the lower part of the housing,
- a first set of seats (50) located at the lateral walls of the housing (1), the first set of seats (50) adapted to receive skewer holders (49),
- a reflector (23) located inside of the first lid (6), the reflector (23) is connected to a perimeter of the first lid (6) forming an air chamber (25),
- electric heating elements (22) located inside the first lid (6),
- hinged skewers holders (26) located inside the first lid (6),
- a second set of seats (59) located at a front side and a rear sides of the first lid (6),
- a removable grill (24) placed on top of the second set of seats (59),
- a second seat located at the front side of the first lid (6), the second seat (30) receives the stop (15),
- a control panel (31) located on an outer side of the first lid (6),
- hinged legs (28) installed on the outer upper side of the first lid (6),
- wherein the locking rotary devices (7) are identical and each one includes a body (33) and a retractable fork (34) located inside the body (33), wherein each one of the retractable forks (34) move in a vertical direction, wherein a lower part of each one of the retractable forks (34) is fixed to the body (33),
- wherein an upper part of each one of the retractable forks (34) is connected to a mounting bracket (35) having a latch (46),
- wherein each one of the retractable forks (34) include a third seat (47) to receive the corresponding latch (46),
- a fourth seat (37) located in each one of the bodies (33) to receive a latch (36) to lock the corresponding retractable fork (34),
- wherein the bodies (33) are interconnected by a hollow tube (39),
- a cable (40) located inside the hollow tube (39), the cable connects the latches (36),
- mounting brackets (35) interconnected by an axle (42),
- wherein a lower parts of each one of the bodies (33) is attached to the rear wall (3) of the housing (1), and
- wherein the mounting brackets (35) are attached the to the first lid (6).

2. A universal device for heat treatment of food products comprising:

a housing (1) having lateral walls (4, 5), a front wall (2), a rear wall (3), a lower part, and an inside part, a hinged lid (6) connected to the housing (1) by locking rotary devices (7), a tray (9) located inside the housing (1), on the lower part, the tray (9) is adapted to receive raw materials being processed, wherein the tray (9) is mounted on protrusions (14) located on the front wall (2), the rear wall (3), and the lateral walls (4, 5), a second lid (11) attached to an upper part of the tray, (9)

a seat (10) located on the front wall (2) of the housing, a receive stop (15) to attach the first lid (6) to the seat (10), legs (18) located at the lower part of housing (1), guide slides (19) located at the lower part of the housing (1), a first set of seats located on the lateral walls (4, 5), a second set of seats adapted to receive skewer holders (49), a reflector (23) located inside of the first lid (6), the reflector (23) is connected to a perimeter of the first lid (6) forming an air chamber (25), electric heating elements (22) located inside of the first lid (6), hinged skewers holders (26) located at a front side and a rear sides of the first lid (6), a second set of seats (59) located at the front side of the first lid (6), a removable grill (24) placed on top of the second set of seats, a second seat (30) to receive the stop (15), a control panel (31) located on an outer side of the first lid (6), hinged legs (28) installed on the outer upper side of the first lid (6), wherein the locking rotary devices (7) are identical and each one includes a body (33) and a retractable fork (34) installed inside the body (33), wherein each one of the retractable forks (34) moves in a vertical direction, wherein a lower part of each one of the retractable forks (34) is fixed in the body (33), wherein an upper part of each one of the retractable forks (34) is connected to a mounting bracket (35) having a latch (46), wherein each one of the retractable forks (34) include a third seat (47) to receive the corresponding latch (46), a fourth seat (37) located on each one of the bodies (33), to receive a latch (36) to lock the corresponding retractable fork (34), wherein the bodies (33) are interconnected by a hollow tube (39), a cable (40) located inside the hollow tube (39) for connecting the latches (36), mounting brackets (35) are interconnected by an axle (42), wherein the lower parts of each one of the bodies (33) are attached to rear wall (3) of the housing (1), and wherein the mounting brackets (35) are attached to the first lid (6).

3. The universal device according to claim 1, further comprising a container (45) adapted to receive cutlery.

4. A universal device for heat treatment of food products comprising:

a housing (60) including lateral walls, an upper part, a front wall, a rear wall, a lower part, and an inside part, a first lid (61) and a second (62) lids connected to the housing (60) by using locking rotary devices (63), the first lid (61) and the second lid (62) are identical, a control panel (12) located at the front wall of housing (60), for controlling operation of electric heating elements (22) installed inside housing (60), recesses (80) located at the upper part of housing (60), the recesses (80) receive fixing elements for locks (27) of the first lid (61) and the second lid (62), the first lid (61) and the second lid (62) have a rectangular shape and contain inside a reflector (64), skewer holders (26) having a body (65) are connected to the housing (60), air chambers (66) located between inner sides of the first lid (61) and the second lid (62) and reflectors (64), a first seat (79) to receive a reflector (64) and a second seat (82) to receive the body (65) of the skewer holders are located on each one of the first lid (61) and the second lid (62), abutting legs (83) located on an outer side of each one of the first lid (61) and the second lid (62), wherein the locking rotary devices (63) are identical, and each one includes a body (70), a right T-shaped retractable fork (71) and a left U-shaped retractable fork (72); the right T-shaped retractable fork (71) and left U-shaped retractable fork (72) are connected through coupling links (74) to mounting brackets (73) with the possibility of rotation on axles (75; 76), wherein the body (70) of each one of the locking rotary devices (63) include a first axle (77) to move the right T-shaped retractable fork (71), and a second axle (78) to move the left U-shaped retractable fork (72), wherein the lower part of the housing (60) is connected to the body (70) of each one of the locking rotary devices (63), and wherein a lower parts of each one of the first lid (61) and the second lid (62) is connected to the mounting brackets (73) of the corresponding locking rotary devices (63).

5. A universal device according to claim 4, wherein the housing (60) has a rectangular shape, the front part and the rear part includes a first set of seats (81) to receive electric heating elements (22), and the lower part of housing (60) includes a second set of seats (59) to receive a removable grill (24).

6. A universal device according to claim 4, wherein each one of the retractable forks (71; 72) is installed in the corresponding body (70) of the locking rotary device (63) in such a way that the vertical element of the T-shaped retractable fork (71) is located between two vertical elements of the U-shaped retractable fork (72).

7. The universal device according to claim 2, further comprising a container (45) adapted for receiving cutlery.

\* \* \* \* \*